United States Patent
Saito

(10) Patent No.: US 10,145,688 B2
(45) Date of Patent: Dec. 4, 2018

(54) AVOIDANCE-BEHAVIOR DETERMINING METHOD AND AVOIDANCE-BEHAVIOR DETERMINING DEVICE

(71) Applicant: FUJITSU LIMITED, Kawasaki-shi, Kanagawa (JP)

(72) Inventor: Takahiro Saito, Asaka (JP)

(73) Assignee: FUJITSU LIMITED, Kawasaki (JP)

( * ) Notice: Subject to any disclaimer, the term of this patent is extended or adjusted under 35 U.S.C. 154(b) by 16 days.

(21) Appl. No.: 15/428,593

(22) Filed: Feb. 9, 2017

(65) Prior Publication Data
US 2017/0284808 A1 Oct. 5, 2017

(30) Foreign Application Priority Data

Mar. 31, 2016 (JP) ................. 2016-073315

(51) Int. Cl.
| | |
|---|---|
| *G01C 21/00* | (2006.01) |
| *G01C 21/20* | (2006.01) |
| *B63B 49/00* | (2006.01) |
| *G01S 5/02* | (2010.01) |
| *G08G 3/02* | (2006.01) |
| *B63B 43/00* | (2006.01) |

(52) U.S. Cl.
CPC ............ *G01C 21/203* (2013.01); *B63B 49/00* (2013.01); *G01S 5/0252* (2013.01); *G01S 5/0294* (2013.01); *B63B 43/00* (2013.01); *G08G 3/02* (2013.01)

(58) Field of Classification Search
CPC ........ G08G 3/02; G01C 21/203; B63B 49/00; G01S 5/0252; G01S 5/0294

USPC .......................................................... 701/301
See application file for complete search history.

(56) References Cited

U.S. PATENT DOCUMENTS 9,418,558 B1 * 8/2016 Stamenkovich ......... G08G 3/02

FOREIGN PATENT DOCUMENTS

| JP | 10-250681 | 9/1998 |
| JP | 2004-178258 | 6/2004 |

OTHER PUBLICATIONS

Rina Miyake et al., "Relative distance at the time of collision avoidance manoeuvre based on AIS record data", Sep. 30, 2015, pp. 106-109.

* cited by examiner

*Primary Examiner* — Gertrude Arthur Jeanglaude

(57) ABSTRACT

A non-transitory computer-readable recording medium stores therein a program that causes a computer to execute a process. The process includes calculating, for each of a plurality of grids through which a track of a specific vessel passes, an angle of approach and an angle of exit of the track, respectively; extracting a grid for which the angle of approach and the angle of exit conform to a determining condition set for each of the grids based on the determining condition; and determining whether the specific vessel has taken an avoidance behavior based on a relative distance from another vessel corresponding to a position of the specific vessel in a track in the extracted grid.

8 Claims, 14 Drawing Sheets

FIG.3

| GRID ID | GRID RANGE | |
|---|---|---|
| (1, 1) | (xx, xx), (xx, xx), (xx, xx), (xx, xx) | ⟵31 |
| (1, 2) | (xx, xx), (xx, xx), (xx, xx), (xx, xx) | |
| ⋮ | ⋮ | |

FIG.4

| GRID ID | ANGLE OF APPROACH | ANGLE OF EXIT | VESSEL ID |
|---|---|---|---|
| ... | | | |
| (2, 2) | 88 | 89 | xxxxx1 |
| (2, 2) | 90 | 89 | xxxxx2 |
| (2, 2) | 92 | 91 | xxxxx3 |
| (2, 2) | 93 | 93 | xxxxx4 |
| ... | | | |
| (2, 2) | 265 | 266 | xxxxx95 |
| (2, 2) | 268 | 268 | xxxxx96 |
| (2, 2) | 270 | 269 | xxxxx97 |
| (2, 2) | 271 | 271 | xxxxx98 |
| (2, 2) | 271 | 272 | xxxxx99 |
| ... | | | |

| GRID ID | ANGLE OF APPROACH | ANGLE OF EXIT | VESSEL ID |
|---|---|---|---|
| ... | | | |
| (2, 2) | 88 | 89 | xxxxx1 |
| (2, 2) | 90 | 89 | xxxxx2 |
| (2, 2) | 92 | 91 | xxxxx3 |
| (2, 2) | 93 | 93 | xxxxx4 |
| ... | | | |
| (2, 2) | 265 | 266 | xxxxx95 |
| (2, 2) | 268 | 268 | xxxxx96 |
| (2, 2) | 270 | 269 | xxxxx97 |
| (2, 2) | 271 | 271 | xxxxx98 |
| (2, 2) | 271 | 272 | xxxxx99 |
| ... | | | |

1

AVOIDANCE-BEHAVIOR DETERMINING METHOD AND AVOIDANCE-BEHAVIOR DETERMINING DEVICE

CROSS-REFERENCE TO RELATED APPLICATIONS

This application is based upon and claims the benefit of priority of the prior Japanese Patent Application No. 2016-073315, filed on Mar. 31, 2016, the entire contents of which are incorporated herein by reference.

FIELD

The embodiments discussed herein are related to a computer-readable recording medium, an avoidance-behavior determining method, and an avoidance-behavior determining device.

BACKGROUND

In navigation of vessels, there is a dangerous area where a collision or an accident avoidance behavior occurs more frequently than in other areas. Therefore, there is a technique that performs risk determination for navigation of a vessel based on a relative distance between vessels.

However, even by the risk determination for the navigation of the vessel based on the relative distance between the vessels, it is difficult to detect a dangerous site having a high collision risk with high accuracy in some cases. For example, in navigation in a port, entering to a port facility and continuous traffic on a sea route in the port are present in a mixed manner. Therefore, in the risk determination based on the relative distance between the vessels, a course change for entering from the sea route to a destination pier may be erroneously detected as an avoidance behavior.

Meanwhile, the dangerous site is present not only in a place where a sea route is specified, such as a port, but also in a place where no sea route is specified. Tracks of vessels in a sea area where no sea route is specified include tracks of vessels respectively heading to various destinations. Therefore, when a certain vessel has turned, this turning is not always an avoidance behavior, and it is difficult to determine from a track itself whether the vessel takes an accident avoidance behavior.

SUMMARY

According to an aspect of an embodiment, a non-transitory computer-readable recording medium stores therein a program that causes a computer to execute a process. The process includes calculating, for each of a plurality of grids through which a track of a specific vessel passes, an angle of approach and an angle of exit of the track, respectively; extracting a grid for which the angle of approach and the angle of exit conform to a determining condition set for each of the grids based on the determining condition; and determining whether the specific vessel has taken an avoidance behavior based on a relative distance from another vessel corresponding to a position of the specific vessel in a track in the extracted grid.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a data structure of grid information;
FIG. 4 is a diagram illustrating an example of a data structure of grid-passing vessel information.

DESCRIPTION OF EMBODIMENTS

Preferred embodiments of the present invention will be explained with reference to accompanying drawings. The present invention is not limited to the embodiments. Respective embodiments can be combined appropriately within a scope in which processing contents do not contradict each other. There is described below a case where the present invention is applied to a support system that supports navigation of vessels, as an example.

[a] First Embodiment

System Configuration

Figure 1:
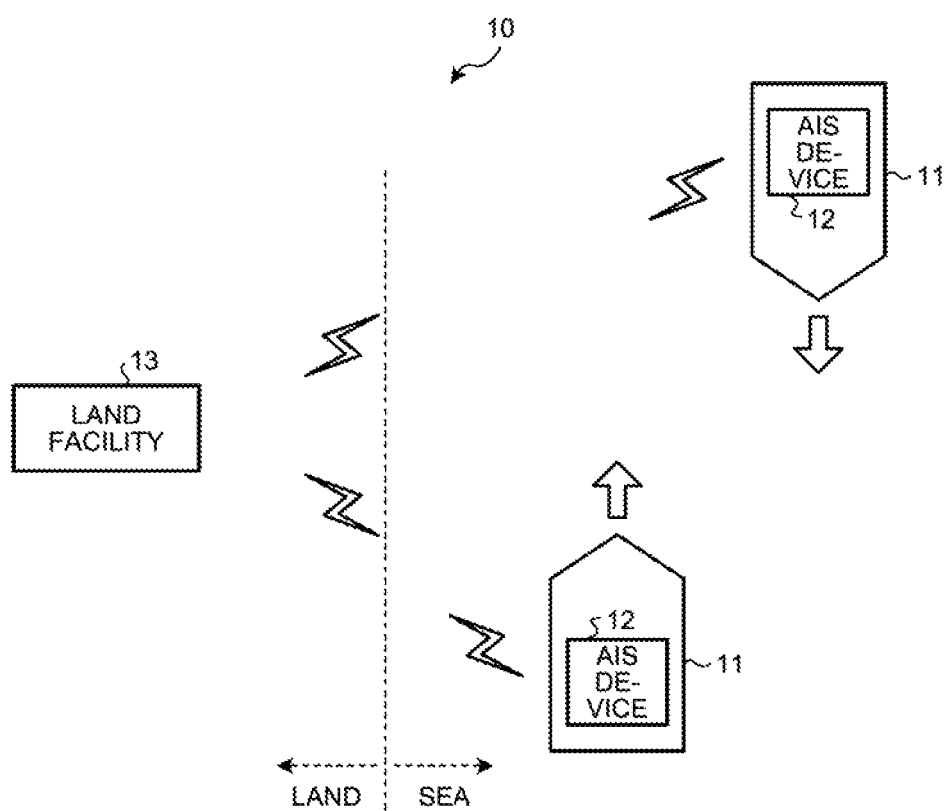
FIG. 1 is a diagram illustrating an example of a schematic configuration of a support system.

First, an example of a support system 10 according to a first embodiment is described. FIG. 1 is a diagram illustrating an example of a schematic configuration of a support system. The support system 10 is a system that supports navigation of vessels.

FIG. 1 illustrates two vessels 11 and a land facility 13. The vessel 11 has an AIS device 12 mounted thereon. For example, specific vessels are needed to have the AIS device 12 mounted thereon by law or the like. The specific vessels include all vessels with a gross tonnage of 300 tons or more engaged in international voyages, all passenger vessels engaged in international voyages, and all vessels with a gross tonnage of 500 tons or more not engaged in international voyages. Vessels other than the specific vessels can have the AIS device 12 mounted thereon.

The AIS device 12 periodically transmits AIS information including various types of information related to the vessel 11 on which that AIS device 12 is mounted by wireless communication. For example, the AIS information includes information on a position by a longitude and a latitude, a vessel name, a time, a bow direction of the vessel 11, an identification code of the vessel 11, such as an MMSI (Maritime Mobile Service Identity) number, the length and the width of the vessel 11, and the like. The AIS information is receivable by another vessel 11 and the land facility 13. The other vessel 11 and the land facility 13 can understand the various types of information, for example, the position of the vessel 11, the vessel name, the time, the bow direction of the vessel 11, the identification code of the vessel 11, and the length and the width of the vessel 11 based on the received AIS information.

The land facility 13 is a facility that controls navigation of respective vessels 11, for example, Traffic Advisory Service Center or a harbor traffic control service of Japan Coast Guard. The land facility 13 understands the position of each vessel 11 based on AIS information received from each vessel 11, information detected by a radar, and the like, and provides various types of information related to marine traffic to each vessel 11.

Configuration of Avoidance-Behavior Determining Device

Figure 2:
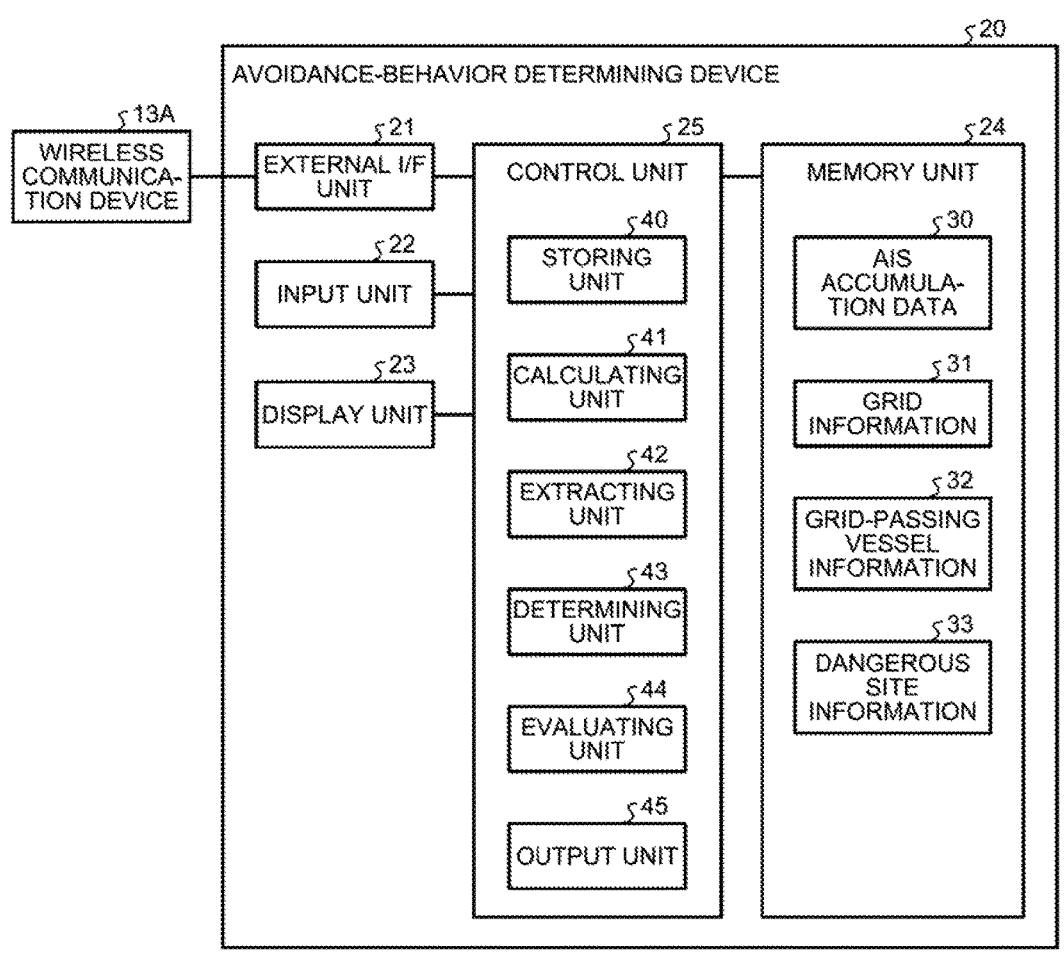
FIG. 2 is a diagram illustrating a schematic configuration of an avoidance-behavior determining device.

Next, a configuration of an avoidance-behavior determining device 20 according to the first embodiment is described. FIG. 2 is a diagram illustrating a schematic configuration of an avoidance-behavior determining device. The avoidance-behavior determining device 20 is installed in the land facility 13 and supports navigation of vessels. For example, the avoidance-behavior determining device 20 is a computer, such as a server computer. The avoidance-behavior determining device 20 can be implemented as a single computer, or can be implemented by a plurality of computers. In the present embodiment, there is described a case where the avoidance-behavior determining device 20 is implemented as a single computer, as an example.

For example, Japan Transport Safety Board provides a marine-accident hazard map that indicates positions at which a vessel accident occurred in the past. However, there are dangerous sites at which an accident avoidance behavior has been frequently observed although no vessel accident has occurred. In other words, the marine-accident hazard map does not indicate a dangerous site at which no vessel accident has occurred so far but there is a potential risk. Therefore, in the present embodiment, there is described a case where the avoidance-behavior determining device 20 evaluates a collision risk in a sea area and generates a hazard map indicating a dangerous site having a high collision risk, as an example.

The avoidance-behavior determining device 20 includes an external I/F (interface) unit 21, an input unit 22, a display unit 23, a memory unit 24, and a control unit 25.

The external I/F unit 21 is an interface that transmits/receives various types of information to/from another device, for example. The external I/F unit 21 is configured to be communicable with each vessel 11 wirelessly via a wireless communication device 13A, such as an antenna, provided in the land facility 13, and transmits/receives various types of information to/from each vessel 11. For example, the external I/F unit 21 receives AIS information from each vessel 11 via the wireless communication device 13A.

The input unit 22 is an input device for inputting various types of information. Examples of the input unit 22 are input devices that receive an operation input, such as a mouse and a keyboard. The input unit 22 receives an input of various types of information. For example, the input unit 22 receives operation inputs respectively instructing start of various types of processes. The input unit 22 inputs operation information indicating a received operation content to the control unit 25.

The display unit 23 is a display device that displays various types of information. Examples of the display unit 23 are display devices, such as an LCD (Liquid Crystal Display) and a CRT (Cathode Ray Tube). The display unit 23 displays various types of information. For example, the display unit 23 displays various types of screens, such as an operation screen.

The memory unit 24 is a storage device, such as a hard disk, an SSD (Solid State Drive), and an optical disk. The memory unit 24 can be a data-rewritable semiconductor memory, such as a RAM (Random Access Memory), a flash memory, and an NVSRAM (Non Volatile Static Random Access Memory).

The memory unit 24 stores therein an OS (Operating System) and various types of programs executed by the control unit 25. For example, the memory unit 24 stores therein a program that performs an avoidance-behavior determining process described later. The memory unit 24 further stores therein various types of data used in the program executed by the control unit 25. For example, the memory unit 24 stores therein AIS accumulation data 30, grid information 31, grid-passing vessel information 32, and dangerous site information 33.

The AIS accumulation data 30 is data in which AIS information received from each vessel 11 is accumulated.

The grid information 31 is data in which various types of information related to each of grids with a predetermined size obtained by dividing an object range that is an object of navigation control by the land facility 13 is stored. For example, identification information for identifying the grids and information on positions of boundaries of the grids are stored in the grid information 31. The grids will be described in detail later.

FIG. 3 is a diagram illustrating an example of a data structure of grid information. As illustrated in FIG. 3, the grid information 31 has items including "GRID ID" and "GRID RANGE", for example. Each item of the grid information 31 illustrated in FIG. 3 is only an example. The grid information 31 can have other items.

The item of grid ID is a region where identification information for identifying grids is stored. Each grid has identification information assigned thereto for identifying the grid. In the present embodiment, an object range that is an object of navigation control by the land facility 13 is divided into grids with a predetermined size in a grid shape. As the identification information of a grid, a grid ID (identifier) is used that indicates a position by the numbers of grids in the X-axis direction and the Y-axis direction, assuming that one direction of the grid is the X-axis, the other direction is the Y-axis, and a predetermined reference grid is (0, 0). The item of grid range is a region where a latitude and a longitude of each apex of a region of a grid having a grid shape are stored.

The grid-passing vessel information 32 is data in which various types of information related to a vessel that has passed through a grid is stored. For example, an angle of approach and an angle of exit of the vessel that has passed through the grid are stored in the grid-passing vessel information 32.

FIG. 4 is a diagram illustrating an example of a data structure of grid-passing vessel information. As illustrated in FIG. 4, the grid-passing vessel information 32 has items including "GRID ID", "ANGLE OF APPROACH", "ANGLE OF EXIT", and "VESSEL ID", for example. Each item of the grid-passing vessel information 32 illustrated in FIG. 4 is only an example. The grid-passing vessel information 32 can have other items.

The item of grid ID is a region where a grid ID of a grid is stored. The item of angle of approach is a region where an angle of approach to a grid of a vessel that has passed through the grid is stored. The item of angle of exit is a region where an angle of exit from the grid of the vessel that has passed through the grid is stored. The angle of approach and the angle of exit are assumed as angles with respect to a predetermined direction used as a reference (0°). For example, the angle of approach and the angle of exit are right-handed angles with a north direction used as a reference. The angle of exit can be an angle at which the vessel has exit from the grid, and a difference between the angle of exit from the grid and the angle of approach can be used. The item of vessel ID is a region where identification information for identifying the vessel is stored. AIS information includes an identification code of a vessel, for example, an MMSI number, as the identification information of the vessel. In the item of vessel ID, the MMSI number of the vessel that has passed through the grid at the angle of approach and the angle of exit is stored.

The dangerous site information 33 is data in which information related to a dangerous site having a high collision risk is stored.

The control unit 25 is a device that controls the avoidance-behavior determining device 20. As the control unit 25, it is possible to employ an electronic circuit, such as a CPU (Central Processing Unit) and an MPU (Micro Processing Unit), and an integrated circuit, such as an ASIC (Application Specific Integrated Circuit) and an FPGA (Field Programmable Gate Array). The control unit 25 includes an internal memory for storing therein programs that define various types of processing procedures and control data, and performs various types of processes in accordance with the programs and the control data. By operations of the various types of programs, the control unit 25 serves as various types of processing units. For example, the control unit 25 includes a storing unit 40, a calculating unit 41, an extracting unit 42, a determining unit 43, an evaluating unit 44, and an output unit 45.

The storing unit 40 stores AIS information received from each vessel 11 via the wireless communication device 13A, in the AIS accumulation data 30.

The calculating unit 41 calculates, for each grid, an angle of approach and an angle of exit of a vessel that has passed through the grid from the AIS accumulation data 30. For example, the calculating unit 41 refers to the AIS accumulation data 30 and acquires position information indicating positions of a plurality of vessels at each time. The calculating unit 41 obtains, for each vessel, a track of the vessel from the position at each time. The track herein is a track of the position of the vessel. The calculating unit 41 specifies grids through which the track passes through by using the grid information 31. The calculating unit 41 calculates, for each of the grids through which the track passes through, an angle of approach and an angle of exit of the track.

Figure 5:
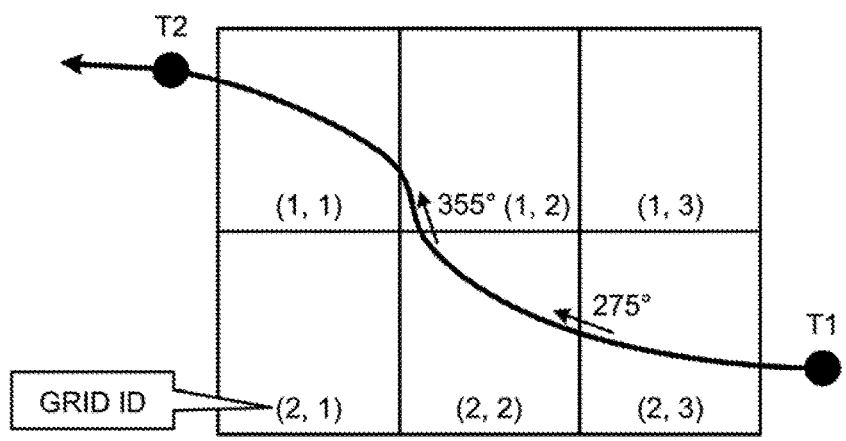
FIG. 5 is a diagram illustrating an example of an angle of approach and an angle of exit for each grid.

FIG. 5 is a diagram illustrating an example of an angle of approach and an angle of exit for each grid. FIG. 5 illustrates a track of a vessel from a time T1 to a time T2. The track passes through grids respectively having grid IDs of (2, 3), (2, 2), (1, 2), and (1, 1). In the track, an angle of approach to the grid with the grid ID (2, 2) is 275°, and an angle of exit is 355°.

The calculating unit 41 stores an angle of approach to the grid, an angle of exit, and an MMSI number of a vessel in the grid-passing vessel information 32, while associating these elements with a grid ID of the grid.

The size of a grid is described here. In a case of a vessel, an avoidance behavior appears as turning that continues for at least 30 seconds or more. For example, it is assumed that a collision risk described later is evaluated in 10 seconds in which it is highly likely that a change can be read. At 10 to 12 [kn (knots)] that is a usual speed when the vessel takes the avoidance behavior, a distance of navigation in 10 seconds is 50 to 60 [m]. Therefore, the grid is assumed to be a rectangular region having a smallest side of 50 [m].

In the grid, the width of one side can be set to 50 to 200 [m]. Also, the grid can have one side with a variable width, while setting the smallest width of the one side to 50 [m]. For example, the smallest width of one side of the grid is set to 50 [m] and a variation width is set to 50 [m]. The calculating unit 41 calculates an angle of approach and an angle of exit of the track in each grid with the smallest width, respectively, from the AIS accumulation data 30. The calculating unit 41 then calculates an angle of course change of the angle of exit with respect to the angle of approach for each grid. The calculating unit 41 then classifies the angles of course change into predetermined classes (for example, with a 1° interval) for the respective grids. The calculating unit 41 calculates a distribution parameter λ, assuming that the classified frequency distribution conforms to an exponential distribution represented by the following expression (1).

$$f(x;\lambda) = \begin{cases} \lambda e^{-\lambda x} & (x \geq 0) \\ 0 & (x < 0) \end{cases} \tag{1}$$

The calculating unit 41 calculates a spatial bias degree of the calculated distribution parameters λ. The spatial bias degree uses a Moran's I statistic represented by the following expression (2), for example.

$$I = \frac{n \sum_{i=1}^{n} \sum_{j=1}^{n} w_{ij}(X_i - \overline{X})(X_j - \overline{X})}{\left(\sum_{i=1}^{n} \sum_{j=1}^{n} w_{ij}\right) \sum_{i=1}^{n} (X_i - \overline{X})^2} \tag{2}$$

In the expression (2),
n: the number of grids in an object range that is an object of navigation control by the land facility 13
$X_i$: a distribution parameter λ of a grid i
$\overline{X}$: an average of the distribution parameters λ of all grids
Further, an incidence matrix $W_{ij}$ in the expression (2) is defined as follows.
When the grid i is adjacent to a grid j: $W_{ij}=1$
When the grid i is not adjacent to the grid j: $W_{ij}=0$ The calculating unit 41 adopts a grid width at a time at which increase of the calculated spatial bias degree is saturated. This method for determining the grid width uses a property that when the grid width is too small, the calculated distribution parameters are not stable because the number of data units is too small, resulting in a small bias degree.

The extracting unit 42 extracts a dangerous site having a potential risk based on the AIS accumulation data 30 and the grid-passing vessel information 32. For example, the extracting unit 42 detects a collision-avoidance behavior of a vessel based on the AIS accumulation data 30 and the grid-passing vessel information 32, and extracts various types of information related to the site for which the avoidance behavior has been detected.

Here, an avoidance behavior that is a target in the present embodiment is described. The avoidance behavior is assumed to satisfy conditions 1 and 2 as described below.

Condition 1: Being a ship handling that reduces a collision risk.

Condition 2: Being a ship handling that aims to (is intended to) avoid a collision.

The collision risk is evaluated by a distance between two vessels coming closest to each other in a case where the two vessels maintain courses and speeds (DCPA: Distance at Closest Point of Approach), for example.

Only by using the site satisfying the condition 1, detection of an avoidance behavior with high accuracy may be difficult. In other words, only from the fact that the collision risk is reduced, detection of the avoidance behavior with high accuracy is difficult in some cases. For example, in navigation in a port, both entering to a port facility and continuous navigation on a sea route in the port are present in a mixed manner. Therefore, in risk determination based on a relative distance between vessels, a course change for entering to a destination pier from the sea route may be erroneously detected as an avoidance behavior. Further, there is a dangerous site not only in a sea area where a sea route is specified, such as a port, but also in a sea area where no sea route is specified. Tracks in the sea area where no sea route is specified include tracks of respective vessels to various destinations, and it is therefore difficult to determine from a track itself whether a vessel has taken an accident-avoidance behavior.

Figure 6:
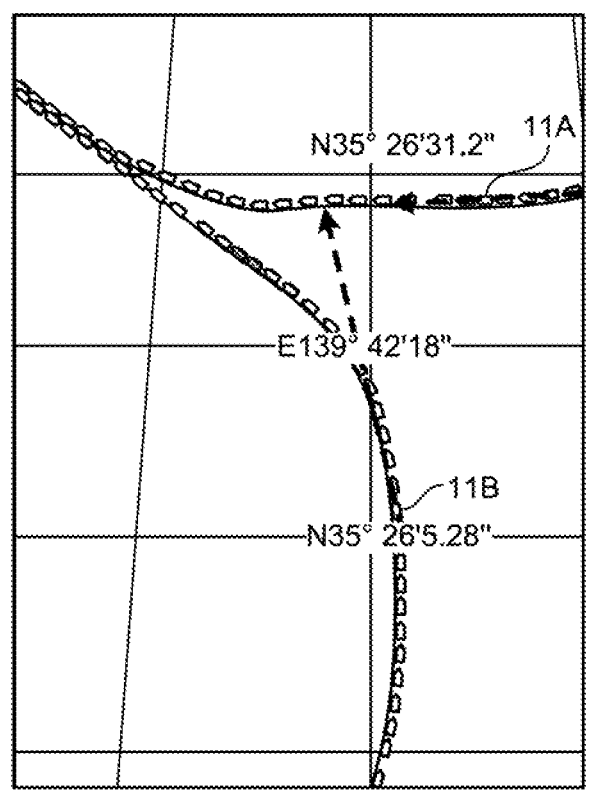
FIG. 6 is a diagram illustrating an example of erroneous detection of a track of as an avoidance behavior.

FIG. 6 is a diagram illustrating an example of erroneous detection of a track as an avoidance behavior. FIG. 6 illustrates tracks of two vessels 11A and 11B and a sea route. The vessels 11A and 11B navigate along a sea route for entering a port. The vessel 11A enters from a right side and turns to the right. The vessel 11B enters from a lower side and turns to the left. By turning of the vessel 11B to the left, a risk of collision between the vessels 11A and 11B is reduced. However, in the example of FIG. 6, it is estimated that the vessel 11B turns to the left in order to enter to the sea route, not for the purpose of an avoidance behavior.

As described above, only from the fact that the collision risk is reduced, detection of the avoidance behavior with high accuracy is difficult in some cases.

Meanwhile, although there are vessels navigating on various courses in the sea area where no sea route is specified, the courses of the vessels are not completely random. The vessels are heading to respective destinations. In other words, when the courses of the vessels are compared with one another, a standard course is found.

Therefore, in the present embodiment, a sea area is divided into grids, and a track of each vessel in the past is stored in the grid-passing vessel information 32 as a pair of an angle of approach to each grid and an angle of exit. The extracting unit 42 refers to the grid-passing vessel information 32 in the memory unit 24, and extracts a grid for which an angle of approach and an angle of exit of a specific vessel that is an object of determination are deviated from angles of approach and angles of exit of other vessels than the specific vessel by predetermined angles or more, respectively. The specific vessel can be specified by a user from the input unit 22. The vessels can be set as the specific vessel one-by-one in turn, so that it can be determined in turn whether the vessel has taken an avoidance behavior.

Figure 7:
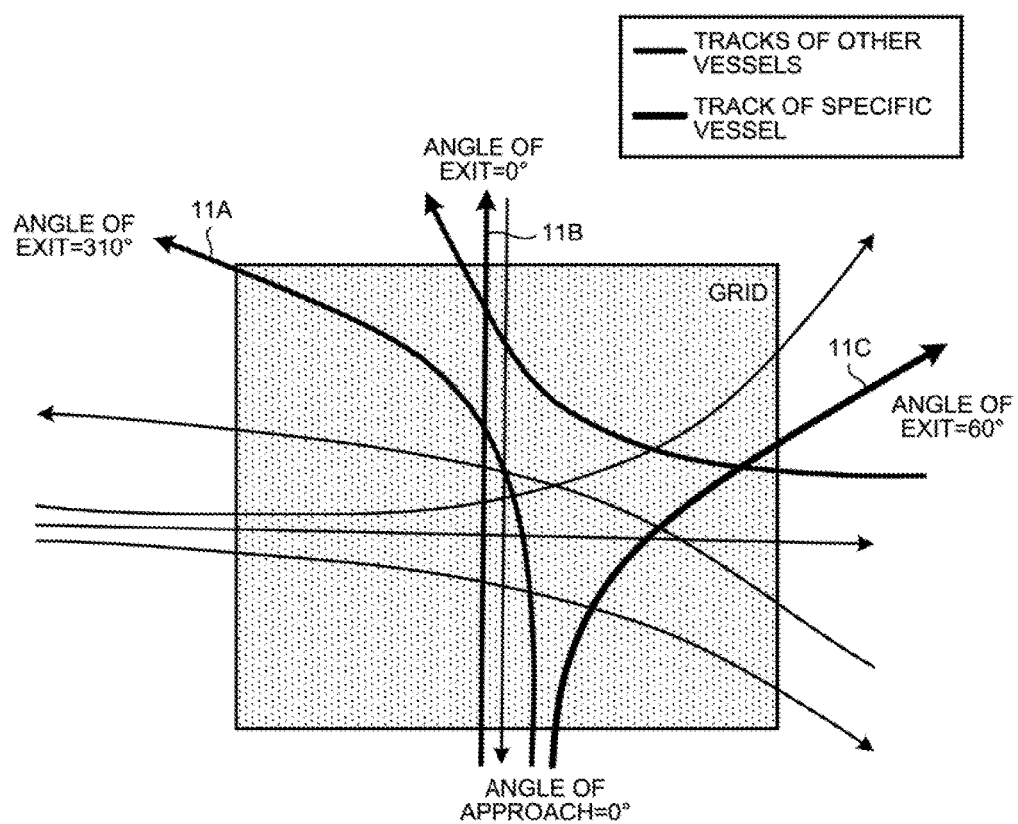
FIG. 7 is a diagram illustrating an example of tracks of respective vessels that have passed through a grid.

FIG. 7 is a diagram illustrating an example of tracks of respective vessels that have passed through a grid. In the example of FIG. 7, a track of a specific vessel that is an object of determination and tracks of other vessels than the specific vessel are illustrated. In the example of FIG. 7, other vessels 11A and 11B that have entered at an angle of approach of 0° each have an angle of exit of 310° to 0°. An angle of exit of a specific vessel 11C that has entered at an angle of approach of 0° is 60°, which is not observed for the other vessels. By comparing the angles of approach and the angles of exit in this manner, it can be determined whether the specific vessel has navigated on a course not observed for the other vessels.

The extracting unit 42 refers to the grid-passing vessel information 32 in the memory unit 24, and performs the following process for each of the grids through which the specific vessel that is the object of determination has passed. With the angle of approach of the specific vessel used as a reference, the extracting unit 42 obtains an angle of exit of another vessel having an angle of approach within a predetermined range. The predetermined range is set to the angle of approach ±5°, for example, but is not limited thereto. The predetermined range can be set to be changeable from an outside. For example, the predetermined range can be changed by an input from the input unit 22, while a screen for setting the predetermined range is displayed on the display unit 23.

The extracting unit 42 determines whether the angle of exit of the specific vessel is deviated from the obtained angle of exit by a predetermined angle or more, and extracts a grid for which the deviation by the predetermined angle or more is observed. For example, the extracting unit 42 calculates, with regard to the obtained angle of exit, a mean value and a standard deviation of angle differences between the angle of approach and the angle of exit. Also, the extracting unit 42 obtains an angle difference between the angle of approach and the angle of exit of the specific vessel. The extracting unit 42 then calculates a deviation-degree evaluation value from the following expression (3).

Deviation-degree evaluation value=|Angle difference of specific vessel−Mean value of angle differences|/Standard deviation of angle differences  (3)

Figure 8:
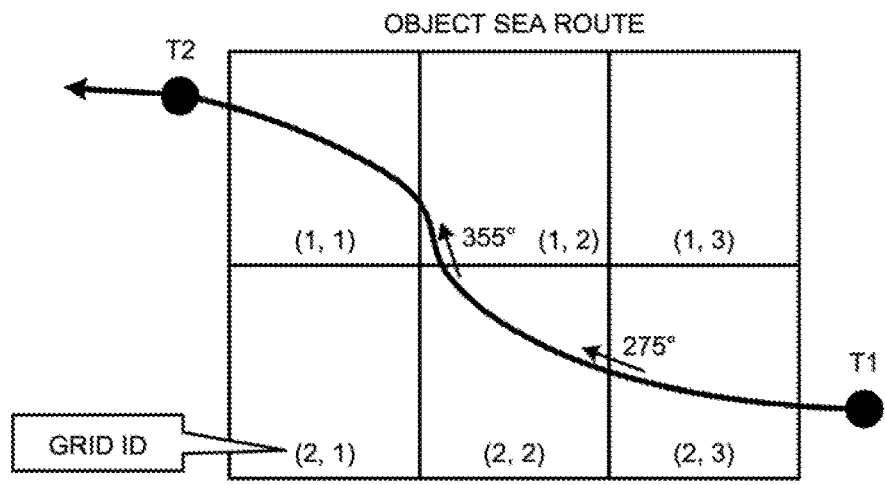
FIG. 8 is a diagram illustrating an example of determination whether deviation occurs.

FIG. 8 is a diagram illustrating an example of determination whether deviation occurs. It is assumed that a specific vessel enters to a grid with a grid ID of (2, 2) at an angle of approach of 275° and exits at an angle of exit of 355°. The extracting unit 42 refers to the grid-passing vessel information 32 and searches a record in which a grid ID is (2, 2) and an angle of approach is 270° or more and 280° or less. In the example of FIG. 8, patterned records are found by the search. The extracting unit 42 calculates a mean value and a standard deviation of angle differences between the angle of approach and the angle of exit with regard to the searched records. In the example of FIG. 8, the mean value is calculated as 1.117 and the standard deviation is calculated as 0.582. The extracting unit 42 calculates a deviation-degree evaluation value. In the example of FIG. 8, the deviation-degree evaluation value is calculated from the expression (3) as 135.61 (≈|80−1.117|/0.582).

When the deviation-degree evaluation value is a predetermined threshold or more, the extracting unit 42 determines that deviation occurs, and extracts the grid. The threshold is set to a value at which deviation can be regarded as occurring in accordance with a calculation method of the deviation-degree evaluation value. For example, the threshold is set to 100 when the expression (3) is used, but is not limited thereto. The threshold can be changeable from an outside. For example, the threshold can be changeable by an input from the input unit 22, while a screen for setting the threshold is displayed on the display unit 23.

The determining unit 43 performs various types of determination. For example, the determining unit 43 determines whether the specific vessel has taken an avoidance behavior in the extracted grid. For example, the determining unit 43 refers to the AIS accumulation data 30 and acquires position information indicating positions at each time of the specific vessel and another vessel around the specific vessel when the specific vessel has passed through the extracted grid. The determining unit 43 acquires position information indicating positions at each time of the specific vessel and another vessel within a predetermined distance from the specific vessel. The predetermined distance is set to 500 m, for example, but is not limited thereto. The predetermined distance can be changeable from an outside. For example, the predetermined distance can be set to be changeable by an input from the input unit 22, while a screen for setting the predetermined distance is displayed on the display unit 23.

The determining unit 43 uses the acquired position information indicating the positions at each time of the plural vessels to obtain, with regard to the specific vessel and other vessels for each combination of two vessels, a relative distance between the two vessels, and determines whether the specific vessel has taken an avoidance behavior. For example, the determining unit 43 calculates a collision risk at each time for each combination of two vessels in chronological order, and determines whether the specific vessel has taken an avoidance behavior when the collision risk is reduced. For example, the determining unit 43 calculates a distance between two vessels coming closest to each other when the two vessels maintain courses and speeds (DCPA) at each time, as the collision risk at each time. The determining unit 43 then determines that the specific vessel has taken an avoidance behavior in a case where the DCPA for the two vessels decreases below a first threshold and thereafter increases to a predetermined second threshold larger than the first threshold or more, while corresponding to a period during which the specific vessel has passed through the extracted grid.

Figure 9:
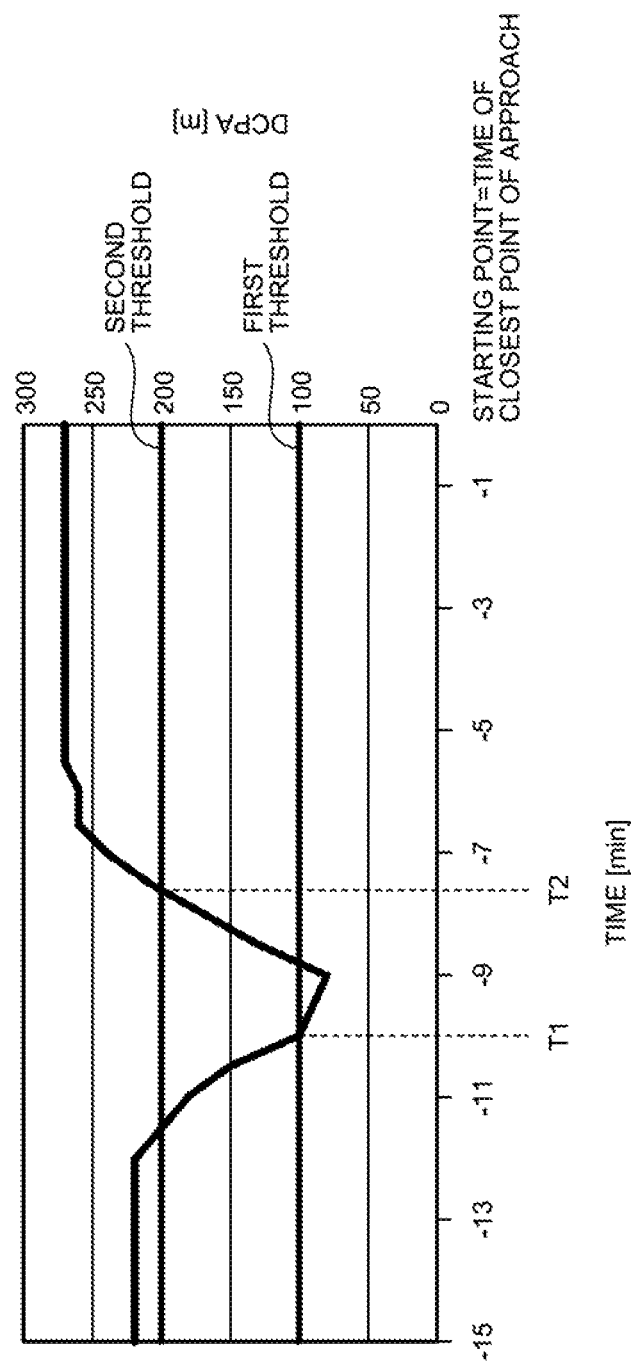
FIG. 9 is a diagram illustrating an example of a change in a DCPA.

FIG. 9 is a diagram illustrating an example of a change in a DCPA. The example of FIG. 9 illustrates a change in the DCPA in a case where two vessels maintain courses and speeds, respectively, at each time from a predetermined time before a time at which the two vessels actually come closest to each other. The determining unit 43 obtains a period in which the DCPA for the two vessels decreases below a first threshold and thereafter increases to a predetermined second threshold larger than the first threshold or more. The first threshold is set to 100 m, for example, and the second threshold is set to 200 m, for example. However, the first threshold and the second threshold are not limited thereto. The first threshold and the second threshold can be set to be changeable from an outside. For example, the first threshold and the second threshold can be set to be changeable by an input from the input unit 22, while a screen for setting the first threshold and the second threshold is displayed on the display unit 23. Further, the first threshold and the second threshold can be changed in accordance with the types and the sizes of the two vessels. For example, in a case where one of the two vessels is a vessel with a high-risk cargo loaded thereon, the first threshold and the second threshold can be changed to larger values. It can be found from navigation-related information included in AIS information, for example, whether the loaded cargo has a high risk. Further, as the vessel is longer, for example, the first threshold and the second threshold can be changed to larger values.

The determining unit 43 specifies the time T1 at which the DCPA for the two vessels decreases below the first threshold and the time T2 at which the DCPA for the two vessels increases to the second threshold or more.

The determining unit 43 determines that the specific vessel has taken an avoidance behavior, in a case where a period from the time T1 to the time T2 of the extracted two vessels includes a period in which the vessels pass through the extracted grid.

Figure 10:
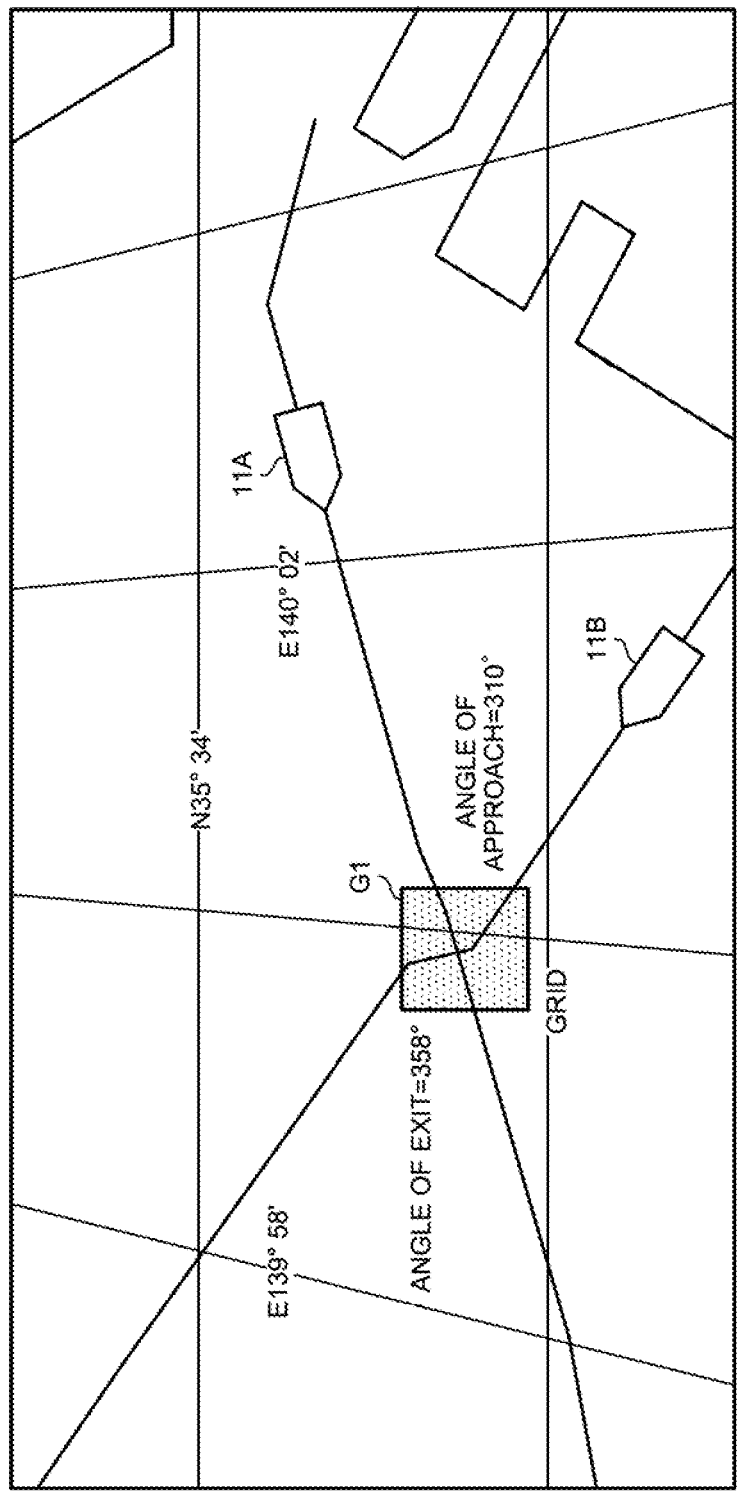
FIG. 10 is a diagram illustrating an example of a track that is determined as an avoidance behavior.

FIG. 10 is a diagram illustrating an example of a track that is determined as an avoidance behavior. FIG. 10 illustrates tracks of two vessels 11A and 11B. The vessel 11B turns to the right in a grid G1 because the vessel 11B comes close to the vessel 11A. This turning of the vessel 11B to the right in the grid G1 reduces a collision risk. Further, in the grid G1, angles of exit of past vessels navigating therein at an angle of approach of 310° fall within a range of 310±5°. Meanwhile, an angle of exit of this vessel 11B is 358°, and it is therefore determined that the track of the vessel 11B is a track not observed for the past vessels. Therefore, the track of the vessel 11B in the grid G1 is determined as an avoidance behavior.

Figure 11:
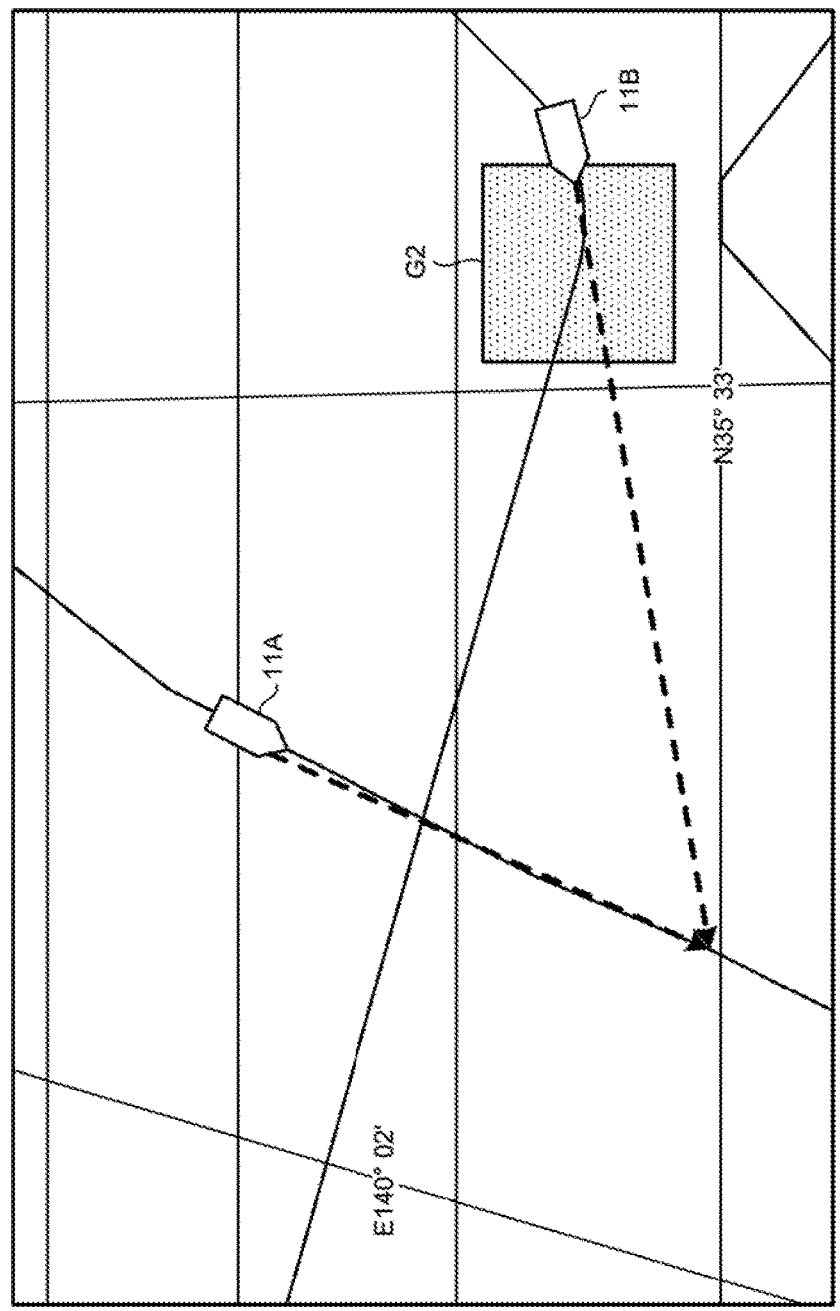
FIG. 11 is a diagram illustrating an example of a track that is not determined as an avoidance behavior.

FIG. 11 is a diagram illustrating an example of a track that is not determined as an avoidance behavior. FIG. 11 illustrates tracks of two vessels 11A and 11B. The vessel 11A crosses ahead of the vessel 11B. The vessel 11B turns to the right in a grid G2. Although the vessel 11B collides with the vessel 11A at an intersection of broken arrows of the vessels 11A and 11B unless the vessel 11B turns, a collision risk is reduced because of turning of the vessel 11B to the right in the grid G2. However, for the grid G2, about 63% of past vessels entering at the same angle of approach as the vessel 11B exit at the same angle of exit as the vessel 11B. Therefore, the track of the vessel 11B in the grid G2 is not determined as an avoidance behavior.

The evaluating unit 44 evaluates risks at a plurality of points in a sea area. For example, the evaluating unit 44 counts the number of detections of a vessel that has taken an avoidance behavior for each certain range in the sea area. The evaluating unit 44 then regards a range where the vessel that has taken the avoidance behavior has been detected a predetermined number of times or more as a dangerous site having a high collision risk, and stores for each dangerous site various types of information, such as a position of the dangerous site and information of the vessel having taken the avoidance behavior, in the dangerous site information 33. A manner of evaluating the risk is only an example, but is not limited thereto. For example, the evaluating unit 44 can store all positions at each of which the vessel having taken the avoidance behavior has been detected in the dangerous site information 33 as dangerous sites.

The output unit 45 performs various types of outputs. For example, the output unit 45 generates data of a hazard map in which the positions of the dangerous sites having a high collision risk stored in the dangerous site information 33 are plotted on a sea area, and outputs the hazard map to a screen and/or an external device. This enables the dangerous sites to be specified.

Process Flow

Figure 12:
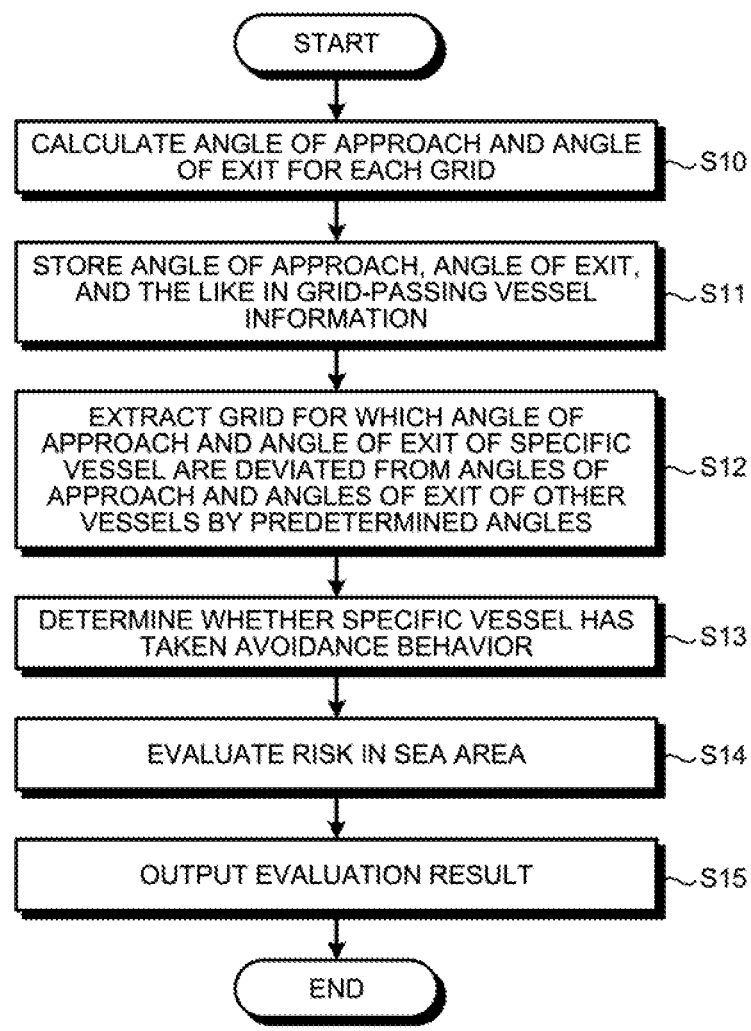
FIG. 12 is a flowchart illustrating an example of a procedure of an avoidance-behavior determining process.

Next, there is described a flow of an avoidance-behavior determining process in which the avoidance-behavior determining device 20 according to the present embodiment determines an avoidance behavior. FIG. 12 is a flowchart illustrating an example of a procedure of the avoidance-behavior determining process. This determining process is performed at a predetermined timing, for example, at a timing at which a predetermined operation instructing a start of the process is received.

As illustrated in FIG. 12, the calculating unit 41 calculates for each grid an angle of approach and an angle of exit of a vessel that has passed through the grid from the AIS accumulation data 30 (S10). The calculating unit 41 stores the angle of approach to the grid, the angle of exit, and an MMSI number of the vessel in the grid-passing vessel information 32, while associating these elements with a grid ID of the grid (S11).

The extracting unit 42 refers to the grid-passing vessel information 32 in the memory unit 24, and extracts a grid for which an angle of approach and an angle of exit of a specific vessel that is an object of determination are deviated from angles of approach and angles of exit of other vessels than the specific vessel by predetermined angles or more, respectively (S12). The determining unit 43 determines whether the specific vessel has taken an avoidance behavior in the extracted grid (S13). For example, the determining unit 43 determines that the specific vessel has taken the avoidance behavior, in a case where a DCPA for the specific vessel and another vessel decreases below a first threshold and thereafter increases to a predetermined second threshold larger than the first threshold or more, while corresponding to a period in which the specific vessel passes through the extracted grid.

The evaluating unit 44 evaluates risks at a plurality of points in a sea area (S14). For example, the evaluating unit 44 counts the number of detections of a vessel having taken an avoidance behavior for each certain range in the sea area. The evaluating unit 44 then regards a range where the number of detections of the vessel having taken the avoidance behavior is a predetermined number or more as a dangerous site having a high collision risk, and stores for each dangerous site various types of information, such as a position of the dangerous site and information of the vessel having taken the avoidance behavior, in the dangerous site information 33.

The output unit 45 outputs an evaluation result (S15), and ends the process. For example, the output unit 45 generates data of a hazard map in which the positions of the dangerous sites having a high collision risk stored in the dangerous site information 33 are plotted on the sea area, and outputs the hazard map onto a screen.

Effects

The avoidance-behavior determining device 20 according to the present embodiment calculates each of an angle of approach and an angle of exit of a track of a specific vessel for each of a plurality of grids set in an object sea area, through which the track of the specific vessel passes. The avoidance-behavior determining device 20 extracts a grid for which an angle of approach and an angle of exit conform to a determining condition set for each of the grids, based on the determining condition. The avoidance-behavior determining device 20 determines whether the specific vessel has taken an avoidance behavior based on a relative distance from another vessel, corresponding to a position of the specific vessel in the track in the extracted grid. In this manner, the avoidance-behavior determining device 20 can detect the avoidance behavior with high accuracy.

Further, the avoidance-behavior determining device 20 according to the present embodiment refers to the grid-passing vessel information 32 in the memory unit 24, and extracts a grid for which the angle of approach and the angle of exit of the specific vessel are deviated from angles of approach and angles of exit of other vessels than the specific vessel by predetermined angles or more, respectively. In this manner, the avoidance-behavior determining device 20 can detect a grid in which navigation not observed for the other vessels and suspected of being an avoidance behavior has been performed, with high accuracy even in a sea area where no sea route is specified.

Furthermore, the avoidance-behavior determining device 20 according to the present embodiment uses the angle of approach of the specific vessel as a reference, and obtains an angle of exit of another vessel having an angle of approach within a predetermined range. The avoidance-behavior determining device 20 extracts a grid for which the angle of exit of the specific vessel is deviated from the obtained angle of exit by a predetermined angle or more. In this manner, the avoidance-behavior determining device 20 can detect a grid for which the angle of approach is the same but the angle of exit is deviated from that of the other vessel and in which navigation suspected of being an avoidance behavior has been performed, with high accuracy.

In addition, the avoidance-behavior determining device 20 according to the present embodiment determines that the specific vessel has taken an avoidance behavior, in a case where the relative distance between the specific vessel and the other vessel decreases below a first threshold and thereafter increases to a second threshold or more in a predetermined period including a period in which the navigation on the track in the extracted grid has been performed. Therefore, the avoidance-behavior determining device 20 can detect the avoidance behavior with high accuracy.

[b] Second Embodiment

An embodiment related to the disclosed device is described in the above descriptions. However, the disclosed technique can be carried out in various different forms other than the above embodiment. Therefore, another embodiment included in the present invention is described below.

For example, a case where the predetermined range is set to the angle of approach ±5° has been described as an example in the above embodiment. However, the disclosed device is not limited thereto. For example, the predetermined range can be changed depending on a sea area. A vessel has less flexibility in choosing a course in a port or on a sea route. Therefore, in a case where a grid is in the port or on the sea route, the extracting unit 42 can set the width of the predetermined range to be narrower than that in a case where the grid is out of the port or the sea route. For example, the extracting unit 42 can set the predetermined range to the angle of approach ±2° in the case where the grid is in the port or on the sea route, and can set the predetermined range to the angle of approach ±5° in a case where the grid is in a sea area out of the port or the sea route.

Figure 13:
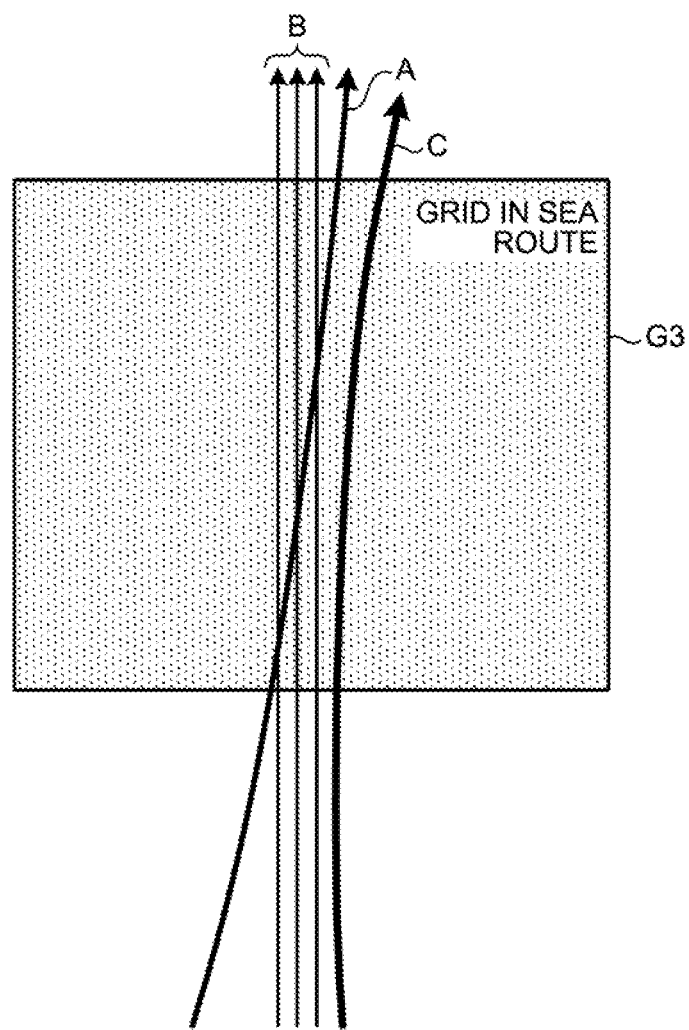
FIG. 13 is an explanatory diagram of an example of tracks in a sea route.

FIG. 13 is an explanatory diagram of an example of tracks in a sea route. In FIG. 13, tracks of vessels that have passed through a grid G3 in the sea route are illustrated. A track A is a track of a vessel that has entered to the sea route in the grid G3, and has a larger angle of approach than a track of a vessel B that continuously navigates in the sea route from a previous grid of the grid G3. In a case where the predetermined range is set to the angle of approach ±5°, the track A is also included and therefore a deviation degree of a track C of a specific vessel that is an object of determination is small. Meanwhile, in a case where the predetermined range is set to the angle of approach ±2°, the track A is not included and therefore the deviation degree of the track C of the specific vessel that is the object of determination is large. By making the predetermined range narrower in a sea area in the port or on the sea route in this manner, it is possible to distinguish the vessel that is continuously navigating along the sea route from the previous grid and the vessel entering to the sea route in the grid from each other, for example. Therefore, evaluation of deviation can be performed more reasonably.

Further, in the above embodiment, a case has been described as an example, in which a grid conforming to a determining condition is extracted and it is determined whether a specific vessel has taken an avoidance behavior based on a relative distance between the specific vessel and another vessel in tracks in the extracted grid. However, the disclosed device is not limited thereto. For example, a period in which it can be estimated that the specific vessel has taken the avoidance behavior is specified based on a relative distance between the specific vessel and the other vessel. In a case where the track of the specific vessel in the specified period is deviated from tracks of other vessels in the grid, it can be determined that the specific vessel has taken the avoidance behavior. For example, with regard to the specific vessel and other vessels around the specific vessel, the determining unit 43 calculates a DCPA at each time for each combination of two vessels, and specifies a period in which the DCPA decreases below a first threshold and thereafter increases to a second threshold or more. The extracting unit 42 can detect that the specific vessel has taken the avoidance behavior, in a case where the track of the specific vessel is deviated from the tracks of the other vessels in a grid through which the specific vessel passes in the specified period.

Furthermore, in the above embodiment, a case in which with regard to a vessel with AIS information stored in the AIS accumulation data 30 it is determined whether the vessel has taken an avoidance behavior has been described as an example. However, the disclosed device is not limited thereto. For example, it can be detected based on AIS information received from vessels as needed whether a vessel currently navigating has taken an avoidance behavior. Further, an angle of approach and an angle of exit of a vessel in normal navigation that has not taken an avoidance behavior can be stored in the grid-passing vessel information 32 for each grid. For example, the avoidance-behavior determining device 20 detects whether the vessel currently navigating has taken the avoidance behavior based on the AIS information received from the vessels as needed. The avoidance-behavior determining device 20 can store the angle of approach and the angle of exit of the vessel in normal navigation that has not taken the avoidance behavior in the grid-passing vessel information 32. Due to this configuration, only the angle of approach and the angle of exit of the vessel in normal navigation are stored in the grid-passing vessel information 32, and therefore it is possible to detect navigation different from normal navigation more easily by performing comparison with the angle of approach and the angle of exit of the vessel in normal navigation.

Each constituting element of each illustrated device is only functional and conceptual, and it is not always needed that the constituting elements are configured physically as in an illustrated manner. In other words, a specific state of each device in which that device is distributed or integrated is not limited to the illustrated state. All or a part of the constituting elements can be configured by being distributed or integrated functionally or physically by an arbitrary unit in accordance with various kinds of loads or the status of use.

For example, respective processing units, that is, the storing unit 40, the calculating unit 41, the extracting unit 42, the determining unit 43, the evaluating unit 44, and the output unit 45 can be integrated or divided as appropriate. Further, all or an arbitrary part of processing functions performed in the respective processing units can be realized by a CPU and a program analyzed and executed by the CPU or can be realized as hardware by a wired logic.

Avoidance-Behavior Determining Program

Figure 14:
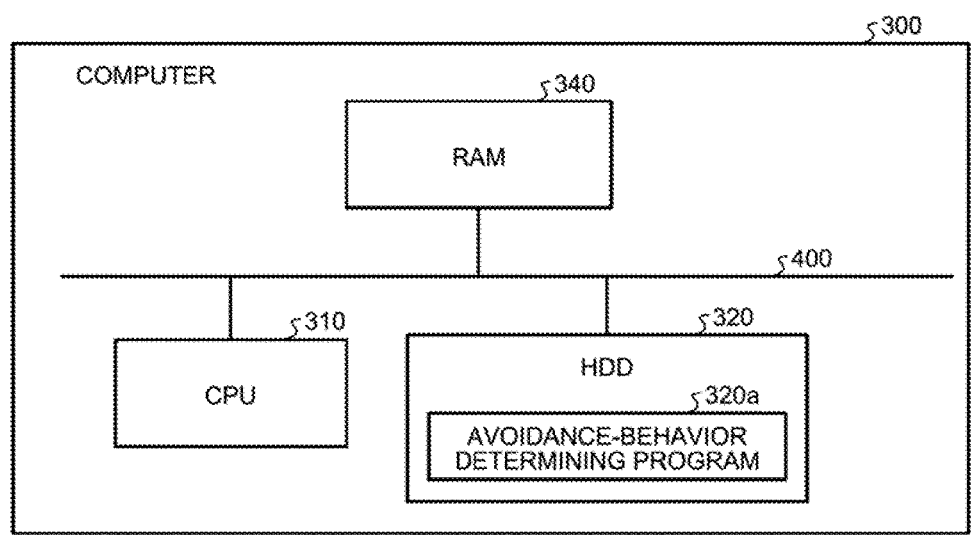
FIG. 14 is a diagram illustrating a computer that executes an avoidance-behavior determining program.

Various types of processes described in the above embodiments can be also realized by execution of programs prepared in advance by means of a computer system, such as a personal computer or a workstation. Therefore, an example of a computer system executing a program that has the same functions as the above embodiments is described below. FIG. 14 is a diagram illustrating a computer that executes an avoidance-behavior determining program.

As illustrated in FIG. 14, a computer 300 includes a CPU 310, an HDD (Hard Disk Drive) 320, and a RAM (Random Access Memory) 340. These respective units 310 to 340 are mutually connected via a bus 400.

In the HDD 320, an avoidance-behavior determining program 320*a* that has the same functions as the respective processing units in the above embodiments is stored in advance. For example, the avoidance-behavior determining program 320*a* that has the same functions as the storing unit 40, the calculating unit 41, the extracting unit 42, the determining unit 43, the evaluating unit 44, and the output unit 45 in the above embodiments is stored in the HDD 320. The avoidance-behavior determining program 320*a* can be divided as appropriate.

Also, the HDD 320 stores therein various types of data. For example, the HDD 320 stores therein an OS and various types of data.

The CPU 310 reads out the avoidance-behavior determining program 320*a* from the HDD 320 and executes the avoidance-behavior determining program 320*a*, to perform the same operations as the respective processing units in the embodiments. In other words, the avoidance-behavior determining program 320*a* performs the same operations as the storing unit 40, the calculating unit 41, the extracting unit 42, the determining unit 43, the evaluating unit 44, and the output unit 45 in the embodiments.

It is not always needed that the avoidance-behavior determining program 320*a* is stored in the HDD 320 from the beginning. For example, a program is stored in "portable physical media" such as a flexible disk (FD), a Compact Disk Read Only Memory (CD-ROM), a Digital Versatile Disk (DVD), a magnet-optical disk, an IC card, which are inserted in the computer 300. Subsequently, the computer 300 can read out the program from these media and execute the program.

Further, the program is stored in "another computer (or a server)" or the like which is connected to the computer 300 via a public line, the Internet, a LAN, a WAN, or the like. Subsequently, the computer 300 can read out the program from these and execute the program.

According to an embodiment of the present invention, it is possible to detect an avoidance behavior with high accuracy.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process comprising:

calculating, for each of a plurality of grids through which a track of a specific vessel passes, an angle of approach and an angle of exit of the track, respectively;

extracting a grid for which the angle of approach and the angle of exit conform to a determining condition set for each of the grids based on the determining condition; and determining whether the specific vessel has taken an avoidance behavior based on a relative distance from another vessel corresponding to a position of the specific vessel in a track in the extracted grid.

2. The non-transitory computer-readable recording medium according to claim 1, wherein the extracting refers to a memory unit that stores therein for each of the grids the angle of approach and the angle of exit of each vessel passing through the each grid, and extracts a grid for which the angle of approach and the angle of exit of the specific vessel are deviated from the angle of approach and the angle of exit of another vessel other than the specific vessel by predetermined angles or more.

3. The non-transitory computer-readable recording medium according to claim 1, wherein the grids are included in a specific sea area.

4. The computer-readable recording medium according to claim 2, wherein the extracting obtains, with the angle of approach of the specific vessel used as a reference, the angle of exit of another vessel having the angle of approach within a predetermined range, and extracts a grid for which the angle of exit of the specific vessel is deviated from the obtained angle of exit by a predetermined angle or more.

5. The non-transitory computer-readable recording medium according to claim 4, wherein the extracting sets a width of a predetermined range to be narrower in a case where the grid is in a port or on a sea route than in a case where the grid is out of the port or the sea route.

6. The non-transitory computer-readable recording medium according to claim 1, wherein the determining determines that the specific vessel has taken an avoidance behavior, in a case where in a predetermined period including a period in which navigation of a track in the extracted grid has been performed, a relative distance between the specific vessel and the another vessel decreases below a predetermined first threshold and thereafter increases to a predetermined second threshold larger than the first threshold or more.

7. An avoidance-behavior determining method comprising:

calculating, by a processor, for each of a plurality of grids through which a track of a specific vessel passes, an angle of approach and an angle of exit of the track, respectively;

extracting, by the processor, a grid for which the angle of approach and the angle of exit conform to a determining condition set for each of the grids, based on the determining condition; and determining, by the processor, whether the specific vessel has taken an avoidance behavior based on a relative distance from another vessel corresponding to a position of the specific vessel in a track in the extracted grid.

8. An avoidance-behavior determining device comprising: a processor that executes a process, the process comprising:

calculating, for each of a plurality of grids through which a track of a specific vessel passes, an angle of approach and an angle of exit of the track, respectively;

extracting a grid for which the angle of approach and the angle of exit conform to a determining condition set for each of the grids based on the determining condition; and determining whether the specific vessel has taken an avoidance behavior based on a relative distance from another vessel corresponding to a position of the specific vessel in a track in the extracted grid.

* * * * *